April 2, 1963   A. S. COOPER   3,083,651
SANDWICH MAKING DEVICE
Filed Jan. 27, 1960

INVENTOR
ABRAHAM S. COOPER
BY Arthur L. Nathanson
ATTORNEY

3,083,651
SANDWICH MAKING DEVICE
Abraham S. Cooper, 419 Miller Ave., Freeport, N.Y.
Filed Jan. 27, 1960, Ser. No. 4,969
3 Claims. (Cl. 107—1)

This invention relates generally to the field of food handling apparatus, and more particularly to an improved device for making sandwiches and similar articles of food, in such manner that the same may be toasted in conventional toasting equipment.

While it is possible to make sandwiches from toasted bread, this operation necessitates the toasting of the slices immediately before the sandwich is assembled and makes it impossible to melt or heat the filler. Any other procedure will normally permit the toast slices to become cold and harden, so that the resulting sandwich is unappetizing, if not inedible. Where sandwiches are made in a commercial eating establishment for sale, the preparation of such sandwiches is usually limited by the potential output of toasting devices on hand and capable of operation over a relatively limited period of time during the rush periods encountered at usual eating hours. Normally, even such capacity cannot be completely utilized, since the operator spends a great deal of time to interrupt the assembly of a sandwich to place additional slices of untoasted bread within the toasting mechanism. As a result, toasted slices remain in the toaster for a period of time after the completion of the toasting operation.

It is known in the art to provide a device which is capable of sub-dividing a single slice of bread into two individual slices, each one-half the normal thickness, and to leave such slice interconnected at one edge thereof. Such a product can be spread on the interior surfaces thereof with a food filter, and subsequently toasted in a toasting device. Experience has proved devices of this type to be unsatisfactory for the reason that with the application of heat from the toasting device, the filler tends to melt or otherwise flow outwardly of the edges of the bread, to place the toasting device in an unsanitary condition as well as result in a completed sandwich or unacceptable appearance.

It is therefore among the principal objects of the present invention to provide a sandwich making device which may be employed to form an assembled untoasted sandwich into a configuration such that it may be readily inserted and cooked in a conventional toasting device having provision for accommodating a single slice of bread.

Another object of the invention lies in the provision of a sandwich making device adapted to compress an assembled sandwich while simultaneously trimming the crusts from the edges of the sandwich and sealing the remaining edge portions under compression to prevent subsequent leakage of the filler during a subsequent toasting operation.

Another object of the invention lies in the provision of a novel sandwich press which may be employed to form sandwiches in tightly assembled condition, whereby the same may be cold or frozen stored prior to toasting without subsequent wrapping, or the employment of other means to maintain the completed sandwich in assembled condition.

Still another object of the invention lies in the provision of an improved sandwich making device in which the cost of fabrication may be of a reasonably low order, with consequent wide sale, distribution and use.

Still another object of the invention lies in the provision of an improved preassembled sandwich which may be sold as a completed food product, requiring only the toasting of the same to place it in edible condition.

A feature of the invention lies in the ease and speed with which a completely assembled sandwich may be reduced in dimensions to a desired size and configuration.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

Figure 1:
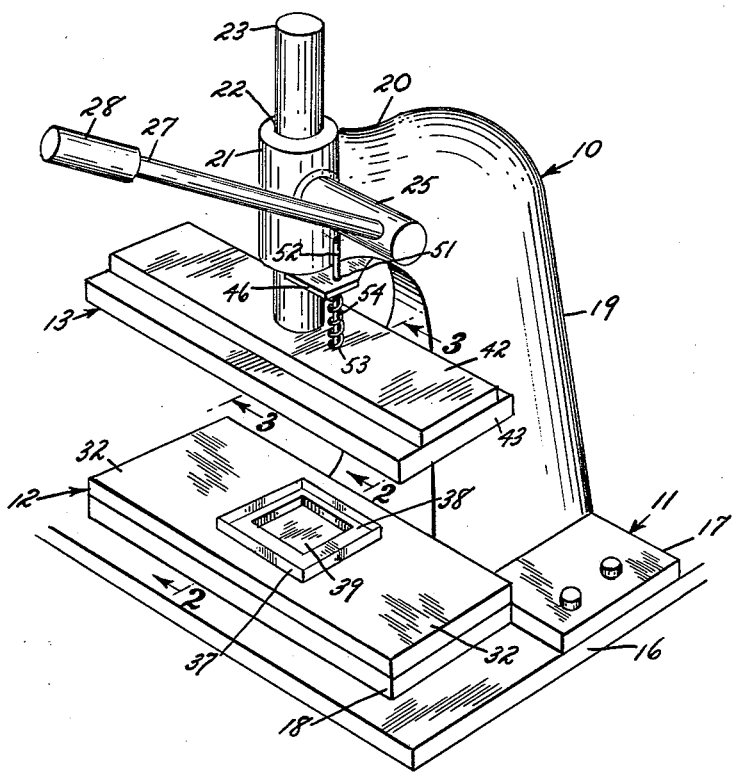
FIGURE 1 is a view in perspective of an embodiment of the invention.
Figure 3:
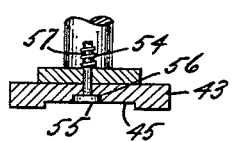
FIGURE 3 is a fragmentary sectional view as seen from the plane 3—3 in FIGURE 1.

In accordance with the invention, the device, generally indicated by reference character 10, comprises broadly: a base or frame element 11, a relatively fixed shaping and cutting element 12 and a movable shaping element 13.

The base element 11 may be of any suitable construction, preferably as a metal casting or forming. It is adapted to be mounted upon a table 16 or other suitable horizontally disposed support, and includes a pair of mounting flanges, one of which is indicated by reference character 17. Disposed co-planar with respect to the mounting flanges 17 is a shaping and cutting element supporting member 18. A vertical column 19 having a laterally extending portion 20 is preferably formed integrally with the members 17 and 18, the portion 20 having a collar-like member 21 having a bore 22 therein. A vertically disposed shaft 23 is slidably positioned within the bore 22, the same having rack teeth meshing with the gear teeth (not shown) on a horizontally disposed shaft 25 extending through the collar 21. A lever arm 27 having a handle member 28 on the extremity thereof transmits manual motion to result in vertical reciprocation of the shaft 23.

The fixed shaping and cutting element 12 may be formed of wood, metal or synthetic resinous materials which may be easily placed in a sanitary condition. As best seen in FIGURE 1, the element 12 includes a planar outer area 32, an inner projecting rectangular area 38 and a rectangular recess 39. The area 38 is bounded by a surface 36 upon which a knife blade 37 is mounted. The sharpened upper edge 40 of the blade 37 extends upwardly of the level of the areas 32 and 38 and forms a stop means against which the movable shaping element 13 is brought into contact during operation.

Figure 2:
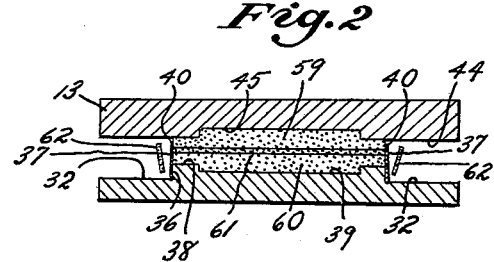
FIGURE 2 is an enlarged fragmentary sectional view as seen from the plane 2—2 in FIGURE 1, with certain of the component parts in altered relative position.

The movable shaping element 13 includes an upper mounting plate 42, preferably of metal, and a lower plate 43 preferably of softer material, so as not to damage the edge 40 when brought into contact therewith. It includes a planar outer area 44 which overlies the areas 32, and 38, there being a rectangular recess 45 which mates with the recess 39 of the element 12, as best seen in FIGURE 2.

Extending laterally from the member 21 is a flange 46 having an opening 51 therein. An ejector rod 52 is slidably mounted in the opening 51 and extends into an opening 53 in the upper and lower plates 42—43. Disposed between the openings 51 and 53, and surrounding the rod 52 is a coil spring 54. The lower end of the rod 52 is provided with a flattened head 55 which is normally positioned within a corresponding recess 56 in the lower plate 43.

Figure 4:
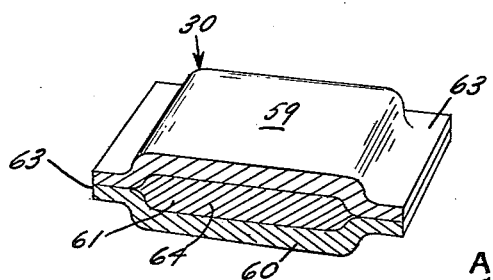
FIGURE 4 is a view in perspective, partly in section, showing a completed sandwich formed in accordance with the invention.

During operation, first and second slices of bread 59 and 60, respectively, are spread with a moist filling 61 and placed in superimposed position. The assembled sandwich is then placed upon the rectangular recess 39 in such manner that the crust portions 62 thereof overlie the edge 40 of the knife blade 37. The movable element 13 is then lowered to simultaneously sever the crust portions 62 and form a compressed peripheral portion 63 which is sealed by the flow of the moist filling 61 under pressure into the pores of the bread. As in the lowered position, the rectangular recesses 39 and 45 and spacing of areas 38 and 44 are of a total depth but slightly greater than that of a normal single slice, the entire thickness of the sandwich is reduced to a corresponding thickness, as seen in FIGURE 4. Thus, the completed sandwich, generally indicated by reference character 30, includes a central portion 64 which contains the bulk of the filling 61 bounded by the still further compressed peripheral portion 63. In this condition, the sandwich will maintain itself in assembled condition, and may be stored without further operations until such time as it is desired to toast the same when, because of its reduced thickness and sealed edges, it can be inserted in a conventional toaster.

A wide variety of filler materials may be employed, the principal requirement being ready spreadability and absence of long fibers, at least with respect to that portion of the filler which comes to the edges 63. Examples of suitable filler materials are cheese (preferably with a low melting point), chopped pre-cooked bacon, without or with cheese, a mixture of peanut butter and jelly, a mixture of cream cheese and jelly, a mixture of cream cheese and chopped olives, pizza filling, and canape spreads, or the like.

Upon the raising of the element 13 with respect to the element 12, should the completed sandwich 30 be lodged within the upper rectangular recess 45, the compression of the spring 54 which bears against a transverse stud 57 will cause pressure to be exerted by the flattened end 55 against the exposed surface of the sandwich, whereby the same is gently pushed out of the recess 45.

It may thus be seen that I have invented novel and highly useful improvements in food handling devices, in which there has been provided a means for rapidly reducing and forming a sandwich, including a soft filling, to a configuration whereby the same may be readily handled in assembled condition for storage or subsequent toasting in devices which are adapted to receive only single slices of bread. Owing to the presence of the sealed peripheral portions, when the sandwich is subsequently heated, the filling tends to remain within the confines of the first and second slices comprising the sandwich, and objectionable flow of the soft filler material outwardly of the peripheral portions is avoided during the normal toasting period. The device comprises relatively few moving parts, and may be constructed using techniques known and existing in the prior art at a relatively low cost of manufacture. If desired, the fixed and movable shaping and cutting elements may be of a multiple type, wherein a plurality of sandwiches may be shaped and trimmed simultaneously, thereby permitting still greater output of an individual worker over a given period of time.

I wish it to be understood that I do not consider the invention limited to the precise details of structure shown and set forth in this specification, for obvious modifications will occur to those skilled in the art to which the invention pertains.

I claim:

1. A sandwich pressing device comprising: first and second mating elements, and means to move at least one of said elements toward the other; said first element having a generally planar peripheral area and a first shaped recess therein, said second element having a generally planar peripheral area and having a projecting area positioned thereon to lie outside said shaped recess in said first element, a knife blade disposed at the outer margin of said projecting area, and adapted to bear upon the peripheral area of said first element, there being a second shaped recess in said projecting area of said second element corresponding in size, shape and position to said first shaped recess in said first element; said first and second recesses and the distance between the planar area of the first element and the projecting area of the second element being of a total depth to compress a portion of a sandwich disposed therebetween to a thickness approximating that of a normally uncompressed single slice of bread.

2. A sandwich pressing device comprising: first and second mating elements, and means to move at least one of said elements toward the other; said first element having a generally planar peripheral area and a first shaped recess therein, said second element having a generally planar peripheral area and having a projecting area positioned thereon to lie outside of, and corresponding in shape to, said shaped recess in said first element, a knife blade disposed at the outer margin of said projecting area, and adapted to bear upon the peripheral area of said first element, there being a second shaped recess in said projecting area of said second element corresponding in size, shape and position to said first shaped recess in said first element; said first and second recesses and the distance between the planar area of the first element and the projecting area of the second element being of a total depth to compress a portion of a sandwich disposed therebetween to a thickness approximating that of a normally uncompressed single slice of bread.

3. A sandwich pressing device comprising: first and second mating elements, and means to move at least one of said elements toward the other; said first element having a generally planar peripheral area and a first substantially rectangularly shaped recess therein, said second element having a generally planar peripheral area and having a substantially rectangularly shaped projecting area positioned thereon to lie outside said substantially rectangularly shaped recess in said first element, a knife blade disposed at the outer margin of said projecting area of said substantially rectangularly shaped projecting area, and adapted to bear upon the peripheral area of said first element, there being a second substantially rectangularly shaped recess in said projecting area of said second element corresponding in size and position to said first substantially rectangularly shaped recess in said first element; said first and second recesses and the distance between the planar area of the first element and the projecting area of the second element being of a total depth to compress a portion of a sandwich disposed therebetween to a thickness approximating that of a normally uncompressed single slice of bread.

References Cited in the file of this patent

UNITED STATES PATENTS

| | | |
|---|---|---|
| 2,060,490 | Borbely | Nov. 10, 1936 |
| 2,138,247 | Tatosian | Nov. 29, 1938 |
| 2,357,867 | Babbitt et al. | Sept. 12, 1944 |
| 2,404,165 | Carver | July 16, 1946 |
| 2,780,181 | Roman et al. | Feb. 5, 1957 |
| 2,855,305 | Cella | Oct. 7, 1958 |
| 2,855,867 | Zeitlin | Oct. 14, 1958 |